United States Patent [19]

Leitz et al.

[11] Patent Number: 4,908,416

[45] Date of Patent: Mar. 13, 1990

[54] MIXTURES OF AROMATIC POLYCARBONATES AND/OR AROMATIC POLYESTERS WITH SPECIAL COPOLYMERS

[75] Inventors: Edgar Leitz; Herbert Eichenauer, both of Dormagen; Karl-Heinz Ott, Leverkusen, all of Fed. Rep. of Germany

[73] Assignee: Bayer Aktiengesellschaft, Leverkusen-Bayerwerk, Fed. Rep. of Germany

[21] Appl. No.: 318,975

[22] Filed: Mar. 6, 1989

[30] Foreign Application Priority Data

Mar. 17, 1988 [DE] Fed. Rep. of Germany ....... 3808837

[51] Int. Cl.$^4$ .............................................. C08L 69/00
[52] U.S. Cl. ................................. 525/411; 524/537; 525/413; 525/415; 525/439; 525/462
[58] Field of Search .............. 525/411, 413, 415, 439, 525/462; 524/537

[56] References Cited

U.S. PATENT DOCUMENTS 3,639,503  2/1972  Matzer ............................... 525/413
4,678,845  7/1987  Takamatsu et al. ................ 525/462

*Primary Examiner*—Theodore E. Pertilla
*Attorney, Agent, or Firm*—Connolly and Hutz

[57] ABSTRACT

The invention relates to mixtures containing
1. thermoplastic, aromatic polycarbonates and/or thermoplastic, aromatic polyesters and
2. copolymers corresponding to formula (Ia)

$$-EA-X-B]_R \qquad (Ia)$$

and, optionally, stabilizers, pigments, mold release agents, flameproofing agents and/or antistatic agents. The invention also relates to a process for the production of the mixtures.

9 Claims, No Drawings

MIXTURES OF AROMATIC POLYCARBONATES AND/OR AROMATIC POLYESTERS WITH SPECIAL COPOLYMERS

European patent application no. 87 119 217.5 (Le A 24 910) relates to sequential copolymers having the following idealized formula:

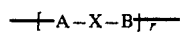 (I)

in which $r = 1$ to 20, more especially 1 to 10,

—A— is the polymer of a cyclic carbonate corresponding to general formulae (II) and/or (III) ("block A")

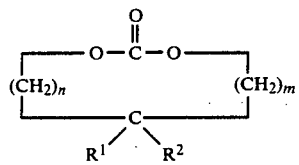 (II)

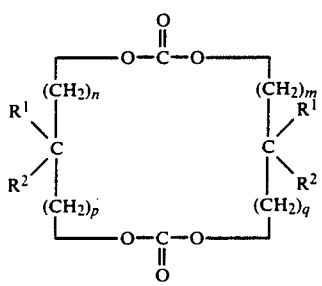 (III)

—B— is the polymer of a lactone corresponding to general formula (IV) ("block B")

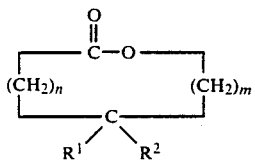 (IV)

X is a middle segment containing both the cyclic carbonate of formula (II) and/or (III) and also the lactone of formula (IV) in polymerized form, the concentration of the structural units of (II) and/or (III) decreasing continuously towards —B— and the concentration of the structural units (IV) decreasing continuously towards —A— ("tapered structure"); in formulae (II), (III) and (IV), m, n, p and q independently of one another are 0, 1, 2, 3, 4, 5 or 6, with the proviso that the sum of $n+m$ in (II) is at least 1, the sum of $n+m$ in (IV) is at least 1 and sums of $n+p$ and $m+q$ in (III) are at least 1, $R^1$ and $R^2$ represent H, $C_1$-$C_6$ alkyl, $C_3$-$C_6$ alkenyl, $C_1$-$C_6$ alk(en)yloxy-$C_1$-$C_6$-alkyl, more especially H, $CH_3$ and $C_2H_5$.

The average molecular weights of the blocks A and B are in the range from 500 to 1,000,000, preferably in the range from 1000 to 500,000 and more preferably in the range from 2000 to 250,000; the average molecular weights of the middle segments X are in the range from 300 to 10,000 and preferably in the range from 500 to 8000.

It should be added that the molecular weights indicated are number average molecular weights ($\overline{M}n$) which, in the case of the blocks A and B, may be established through the monomer/initiator ratio by virtue of the polymerization process (anionic polymerization) (see for example H. G. Elias, "Makromoleküle", Hüthig und Wepf Verlag, Basel, Heidelberg (1975), pages 518 et seq.).

According to EP-A-87 119 217.5, particularly preferred cyclic carbonates (II) and (III) are trimethyl glycol carbonate, neopentyl glycol carbonate, butane-1,4-diol carbonate and also dimeric carbonates of pentanediol or hexanediol.

The preferred lactone (IV) is c-caprolactone and/or pivalolactone.

In the polymers according to the invention, the average molecular weights of the blocks A and B and of the middle segments X may be different or substantially the same.

The polymers contain each of the blocks A and B in quantities of 5 to 95% by weight (based on the total quantity of A+B), but preferably in quantities of 5 to 80% by weight A and 95 to 20% by weight B (based on A+B) and 5 to 80% by weight B and 95 to 20% by weight A (based on A+B); the content of middle segments X having a tapered structure comprises 5 to 50% by weight (based on A+B+X) and preferably 5 to 25% by weight (based on A+B+X).

European patent application no. 87 119 217.5 also relates to a process for the production of the copolymers.

In this process, a solution of a mixture of cyclic carbonates (II) and/or (III) and lactone (IV) in an aromatic solvent or an ether is added in portions (number of portions $=r$) to a solution of an alkyl alkali metal or aryl alkali metal compound as initiator, the mixture is polymerized at $+20°$ C. to $-78°$ C. and preferably at $+10°$ C. to $-30°$ C. and the copolymer is subsequently isolated.

On completion of polymerization, the reaction product may advantageously be neutralized or the anionic polymer formed may be reacted with an alkyl halide, carboxylic acid chloride, carboxylic acid anhydride or carboxylic acid ester.

Suitable aromatic solvents are benzene, toluene; a suitable ether is tetrahydrofuran. To obtain certain molecular weights of the copolymers, the polymerization may also be carried out in mixtures of aromatic hydrocarbons and ethers. Suitable alkyl alkali metal compounds or aryl alkali metal compounds are, for example, butyl lithium, especially sec-butyl lithium, Na naphthalene and K naphthalene.

On completion of the copolymerization, the polymer formed may be neutralized or reacted with suitable compounds which are capable of reacting with carbanions with formation of an uncharged stable end product.

Suitable neutralizing agents are, for example, weak inorganic and organic acids or acidic salts of proton acids, N—H— and C—H—acidic acids; compounds which are capable of reacting with carbanions are, for example, alkyl halides (particularly methyl chloride, methyl iodide, benzyl chloride, benzyl bromide), carboxylic acid chlorides (particularly benzoyl chloride, chloroformic acid ester, phosgene, acetyl chloride, caproyl chloride, stearoyl chloride), carboxylic anhydrides (particularly acetanhydride, succinic anhydride) and carboxylic acid esters (particularly activated esters, such as carboxylic acid phenyl ester, carboxylic acid nitrophenyl ester and also alkyl esters of carboxylic acids), the alkyl groups optionally being substituted by activating groups, such as nitro groups, CN-groups, carboxyl groups.

These compounds are normally added to the reaction product at the end of copolymerization, preferably in dissolved form, their addition having to be accompanied by thorough mixing. It is of advantage to introduce these compounds in a stoichiometric excess.

The copolymer may be isolated from the reaction product, optionally with separation of unwanted impurities.

To this end, the copolymer may be precipitated from the polymer solution and subsequently purified by washing; the copolymer is preferably isolated by evaporation. During or before evaporation, the copolymer may be purified, for example by azeotropic distillation, extraction or fractional distillation.

Because "living" anions are used in the process, corresponding conditions have to be maintained, for example freedom from water. The choice of the reaction conditions for the process according to the invention, particularly temperature and solvent, is important because the polymerization of the cyclic monomers can be accompanied by unwanted termination reactions by which the properties of the copolymers can be adversely affected.

Depending on their monomer composition and the number of polymer blocks present in them (i.e. the number of monomer mixture portions "r" reacted), the copolymers according to European patent application no. 87 119 217.5 differ in their properties from crystalline and brittle to amorphous and elastomeric.

The processing of the copolymers is governed by their properties. For example, moldings can be produced from thermoplastic polymers by known processing techniques for thermoplasts.

The new copolymers suprisingly still show adequate stability during processing even at temperatures above 150° C. and undergo no molecular degradation. Accordingly, moldings produced from them show very good mechanical properties which remain intact even after repeated thermal stressing.

The copolymers according to European patent application no. 87 119 217.5 are particularly suitable —depending on their chemical structure —for the production of films, seals, coalings, particularly where improved long-term behavior is required. They are also suitable for the production of resin-like thermoplastic packaging materials, particularly for foods.

The copolymers may be stabilized, pigmented and antistatically finished with standard additives, improved in their processibility or flameproofed or filled with fillers in known manner.

EXAMPLES

EXAMPLE 1 according to European patent application no. 87 119 217.5

Preparation of a copolymer of neopentyl glycol carbonate and ε-caprolactone (50 mol-%:50 mol-%)

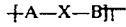

(A = polyneopentyl glycol carbonate block
B = poly-ε-caprolactone block
X = middle segment of neopentyl glycol carbonate and ε-caprolactone units)

A solution of 10.2 g neopentyl glycol carbonate and 8.9 g ε-caprolactone in 100 ml toluene was added at −10° C. to a solution of 0.2 ml sec.-butyl lithium (1.4 M solution in cyclohexane) in 10 ml toluene. A conversion of 90% was reached after 160 minutes; the reaction mixture was decomposed with 10 ml methanol/hydrochloric acid (ratio by weight 9:1). The reaction product is isolated by precipitation with 250 ml methanol.

EXAMPLE 2

Preparation of a copolymer of neopentyl glycol carbonate and ε-caprolactone (50 mol-%:50 mol-%)

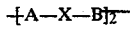

(for the meanings of A, X and B, see Example 1).

A solution of 5.35 g neopentyl glycol carbonate and 4.7 g ε-caprolactone in 50 ml toluene was added at −10° C. to a solution of 0.2 ml sec.-butyl lithium (1.4 M solution in cyclohexane) in 10 ml toluene, followed by stirring for 120 minutes at that temperature. Another solution of 5.35 g neopentyl glycol carbonate and 4.7 g ε-caprolactone in 50 ml toluene was then added and the mixture left to react for another 120 minutes at −10° C. The reaction mixture was worked up by decomposition with 10 ml methanol/hydrochloric acid (ratio by weight 9:1) and precipitation with 250 ml methanol.

EXAMPLE 3

Preparation of a copolymer of neopentyl glycol carbonate and ε-caprolactone (50 mol-%:50 mol-%)

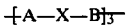

(for the meanings of A, X and B, see Example 1).

A solution of 10.6 g neopentyl glycol carbonate and 9.3 g ε-caprolactone in 100 ml toluene is prepared and cooled to −10° C. One third of the solution is added to 0.2 ml sec-butyl lithium (1.4 M solution in cyclohexane) in 10 ml toluene in a reaction vessel, followed by stirring for 70 minutes at −10° C. The second third of the solution is then added, followed after another 120 minutes by the last third which is again left to react for 120 minutes. The reaction mixture was worked up by decomposition with 10 ml methanol/hydrochloric acid (ratio by weight 9:1) and precipitation with 220 ml methanol.

EXAMPLE 4

Preparation of a copolymer of neopentyl glycol carbonate and ε-caprolactone (60 mol-%:40 mol-%)

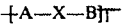

A solution of 15.6 g neopentyl glycol carbonate and 9.1 g ε-caprolactone in 120 ml toluene was added at −10° C. to a solution of 0.4 ml sec-butyl lithium (1.4 M solution in cyclohexane) in 10 ml toluene. After 160 minutes, a conversion of 86% had been reached. After decomposition with 10 ml methanol/hydrochloric acid (ratio by weight 9:1), the reaction product was isolated by precipitation with 260 ml methanol.

EXAMPLE 5

Preparation of a copolymer of neopentyl glycol carbonate and ε-caprolactone (30 mol-%:70 mol-%)

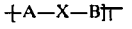

A solution of 7.8 g neopentyl glycol carbonate and 15.96 g ε-caprolactone in 95 ml toluene was added at −10° C. to a solution of 0.4 ml sec-butyl lithium (1.4 M solution in cyclohexane) in 10 ml toluene. After 160 minutes, a conversion of more than 95% had been reached. The reaction mixture was worked up in the same way as described in Example 4.

EXAMPLE 6

Preparation of a copolymer of neopentyl glycol carbonate and ε-caprolactone (80 mol-%:20 mol-%)

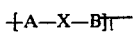

A solution of 20.8 g neopentyl glycol carbonate and 4.56 g ε-caprolactone in 80 ml toluene was added at −10° C. to a solution of 0.4 ml sec-butyl lithium (1.4 M solution in cyclohexane) in 10 ml toluene. After 160 minutes, a conversion of more than 95% had been reached. The reaction mixture was worked up in the same way as in Example 4.

It has now surprisingly been found that the copolymers. disclosed in European patent application no. 87 119 217.5 (Le A 24 910) can be alloyed with thermoplastic, aromatic polycarbonates and/or with thermoplastic aromatic polyesters to form mixtures having interesting properties.

Accordingly, the present invention relates to mixtures containing:

(1.) 10 to 98 parts by weight and preferably 20 to 95 parts by weight of thermoplastic, aromatic polycarbonates and/or thermoplastic, aromatic polyesters and (2.) 90 to 2 parts by weight and preferably 80 to 5 parts by weight of copolymers corresponding to formula (Ia)

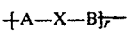 (Ia)

in which r is an integer of from 1 to 20 and preferably of 1 to 10, —A— represents polymers of a cyclic carbonate corresponding to formula (V)

and/or to formula (VI)

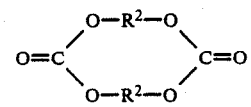

—B— represents polymers of lactones corresponding to formula (VII).

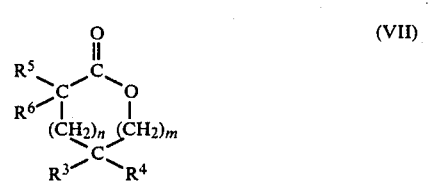

and —X— represents polymers containing both the carbonates (V) and/or (VI) and the lactones (VII) in polymerized form, the concentration of the polymerized carbonates (V) and/or (VI) decreasing continuously towards the blocks —B— and the concentration of the polymerized lactones (VII) decreasing continuously towards the blocks —A— ("tapered structure") and the sum of the parts by weight of components (1.) and (2.) amounting to 100 parts by weight.

$R^1$ in formula (V) is a linear $C_3$-$C_{10}$ alkylene radical or a radical corresponding to formulae (a) to (1):

(a) —$CH_2CH_2CH(CH_3)$—
(b) —$CH_2CH_2OCH_2CH_2OCH_2CH_2$—,
(c) —$CH_2CH(CH_3)CH_2CH_2C(CH_3)_2CH_2$—,

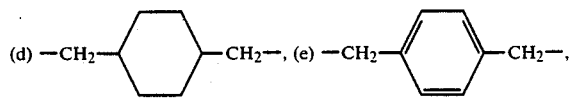

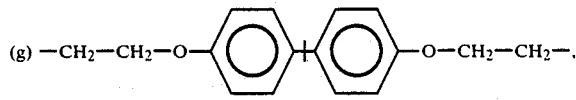

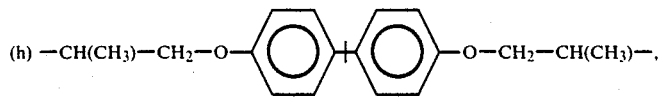

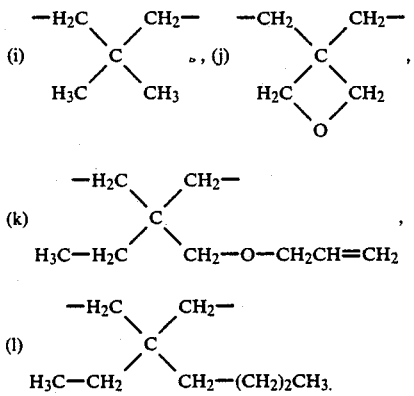

$R^2$ in (VI) is a linear $C_4$-$C_{12}$ alkylene radical or a radical corresponding to formulae (m) or (b):

(m)  —$CH_2$—$CH_2$—O—$CH_2$—$CH_2$— or
(b)  —$CH_2$—$CH_2$—O—$CH_2$—$CH_2$—O—$CH_2$—$CH_2$—

$R^3$, $R^4$, $R^5$ and $R^6$ in formula (VII) may be the same or different and represent H—, $C_1$-$C_6$ alkyl, $C_3$-$C_6$ alkylene, $C_1$-$C_6$ alkoxy and $C_2$-$C_6$-alkyleneoxy-$C_1$-$C_6$-alkyl, preferably H, $CH_3$ and $C_2H_5$; "m" and "n" in (VII) independently of one another are 0, 1, 2, 3, 4, 5 or 6.

Preferred carbonates (V) and (VI) are trimethylene glycol carbonate, neopentyl glycol carbonate, butane-1,4-diol carbonate, the dimeric carbonate of pentanediol and the dimeric carbonate of hexanediol, neopentyl glycol carbonate being particularly preferred. The preferred lactones (VII) are ε-caprolactone and pivalolactone.

In the copolymers of formula (Ia) to be used as component (2.) of the mixture in accordance with the invention, the average molecular weights of the blocks —A— and —B— and of the polymers —X— may be the same or different. The average molecular weights (number averages, $\overline{M}n$) of the blocks A and B may be established through the monomer/initiator ratio by virtue of the polymerization process (anionic polymerization), see for example Hüthig & Wepf Verlag, Basel, Heidelberg (1975), pages 519 et seq.).

The average molecular weights (Mn) are in the range from 1000 to 500,000 and preferably in the range from 2000 to 250,000 for —A—, in the range from 1000 to 500,000 and preferably in the range from 2000 to 250,000 for —B— and in the range from 300 to 10,000 and preferably in the range from 500 to 8000 for —X—.

The polymers contain each of the blocks A and B in quantities of 5 to 95% by weight (based on the total quantity of A+B), but preferably in quantities of 5 to 80% by weight A and 95 to 20% by weight B (based on A+B) and 5 to 80% by weight B and 95 to 20% by weight A (based on A+B); the content of middle segments X having a tapered structure comprises 5 to 50% by weight (based on A+B+X) and preferably 5 to 25% by weight (based on A+B+X).

The copolymers of formula (Ia) to be used as component (2.) of the mixture in accordance with the invention may be prepared in accordance with European patent application no. 87 119 217.5 (Le A 24 910). The same also applies to those copolymers of formula (Ia) which are not covered by formula (I) in that European patent application.

The copolymers (Ia) are prepared by anionic ring-opening solution polymerization of the carbonates (V) and (VI) and of the lactones (VII). The synthesis of the copolymers (Ia) in which r is greater than 1, i.e. copolymers having the following structure —A—X—B—A—X—B— or
—A—X—B—A—X—B—A—X—B requires a step-by-step reaction with step-by-step addition of the reactants corresponding to formulae (V) and/or (VI) and (VII) to the particular copolymers —A—X—B— or —A—X—B—A—X—B— already formed.

In general, the copolymers of formula (Ia) are prepared as follows:

A solution of a mixture of cyclic carbonates (V) and/or (VI) and lactone (VII) in an aprotic, aromatic or aliphatic solvent or ether is polymerized by addition of a solution of an alkyl alkali metal or aryl alkali metal compound or alkali alkyl alcoholate compound as initiator at −78° to +30° C. and preferably at −30° C. to +20° C., the block A being synthesized first, then the tapered middle section X and finally the block B. After the monomers have been fully reacted, the copolymer has the structure A—X—B and is still "polymerization-active".

If the copolymer A—X—B is required, the copolymer is neutralized with loss of its polymerization activity and isolated.

If a copolymer (A—X—B)₂ is required, neutralization of the copolymer is omitted.

The addition of another solution of cyclic carbonates (V) and/or (VI) and lactone (VII) to the polymerization-active solution of the copolymer A—X—B results in the synthesis of a new block A (copolymer structure: A—X—B—A), then X (copolymer structure: A—X—B—A—X) and finally B. The copolymer is now present in a polymerization-active form A—X—B—A—X—B.

If a copolymer having this structure is required, the copolymer is neutralized and isolated.

If a copolymer having the structure (A—X—B)₃ is required, neutralization of the copolymer is again omitted.

The addition of another solution of cyclic carbonates (V) and/or (VI) and lactone (VII) to the polymerization-active solution of the copolymer A—X—B—A—X—B again results in the synthesis of a block A (copolymer structure: A—X—B—A—X—B—A), then X (copolymer structure: A—X—B—A—X-

—B—A—X) and finally B. The copolymer is now present in its polymerization-active form A—X—B—A—X—B—A—X—B.

The copolymer may then be neutralized and isolated. A copolymer having the structure (A—X—B)₄ may be prepared by addition of another solution of cyclic carbonates (V) and/or (VI) and lactone (VII); the same applies where r=5, 6 or another integer of up to 20.

Thermoplastic, aromatic polycarbonates of component (1) suitable for use in accordance with the invention are those based on diphenols corresponding to formula (VIII)

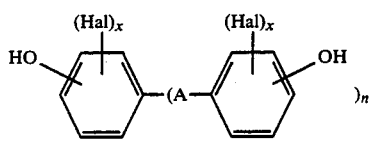

in which

A is a single bond, $C_1$–$C_5$ alkylene, $C_2$–$C_5$ alkylidene, a $C_5$–$C_6$ cycloalkylidene, —S—, —SO₂— or a radical

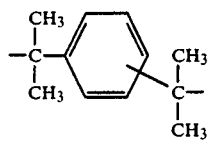

Hal is chlorine or bromine,
x=0, 1 or 2 and
n=1 or 0, and, optionally, to formula (VIIIa)

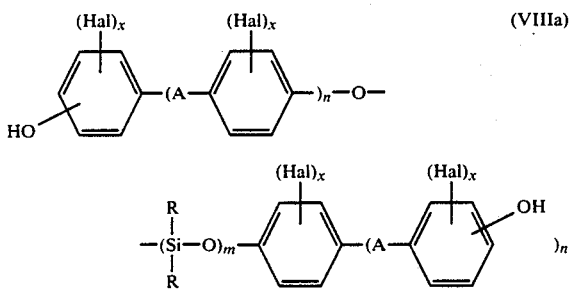

in which

A, Hal, x and n are as defined for formula (VIII), the substituents R may be the same or different and represent linear $C_1$–$C_{10}$ alkyl, branched $C_3$–$C_{20}$ alkyl, $C_6$–$C_{20}$ aryl, preferably CH₃, and m is an integer of from 5 to 100 and preferably from 20 to 80.

The diphenols corresponding to formula (VIII) are known or may be obtained by known methods; hydroxyaryloxy-terminated polydiorganosiloxanes corresponding to formula (VIIIa) are also known (cf. US-PS 3,419,634) or may be prepared by known methods.

Suitable diphenols corresponding to formula (VIII) are hydroquinone, resorcinol, dihydroxydiphenyls, bis-(hydroxyphenyl)-alkanes, bis-(hydroxyphenyl)-cycloalkanes, bis-(hydroxyphenyl)-sulfides, bis-(hydroxyphenyl)-sulfones and α,α'-bis-(hydroxyphenyl)-diisopropylbenzenes and nucleus-chlorinated and nucleus-brominated derivatives thereof.

Examples of suitale diphenols corresponding to formula (VIII) are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane and 2,2-bis-(3,5-dibromo-4-hydroxyphenyl)-propane.

Preferred diphenols corresponding to formula (VIII) are 2,2-bis-(4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Particularly suitable diphenols corresponding to formula (VIIIa) are those in which R is methyl, ethyl, propyl, n-butyl, tert.-butyl or phenyl, more especially those corrsponding to formula (VIIIb)

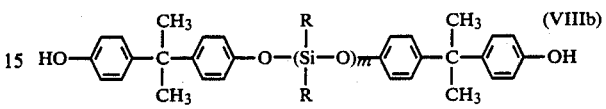

in which the substituents R are the same and have the meanings defined above and m is an integer of 5 to 100 and preferably of 20 to 80.

The diphenols corresponding to formula (VIIIa) may be prepared, for example, from the corresponding bis-chlorine compounds corresponding to formula (IX)

and the diphenols (VIII), for example in accordance with US-PS 3,419,635, column 3, in combination with US-PS 3,189,662.

In the bis-chlorine compounds (IX), R and m have the same meanings as in the diphenols (VIIIa) and (VIIIb).

Polycarbonates of component (1.) suitable for use in accordance with the invention are homopolycarbonates of a diphenol and copolycarbonates of several diphenols, the diphenols of formula (VIIIa) only being used for the preparation of copolycarbonates with the diphenols of formula (VIII) in a quantity by weight of 1 to 50% by weight, preferably 1.5 to 25% by weight and more preferably 2 to 10% by weight, based on the total weight of the diphenols of formulae (VIII) and (VIIIa) used.

Polycarbonates of component (1.) suitable for use in accordance with the invention are also mixtures of a copolycarbonate of the diphenols of formulae (VIIIa) and (VIII) and another siloxane-free thermoplastic polycarbonate, the content of diphenols corresponding to formula (VIIIa) in the polycarbonate mixture, based on the total sum of diphenols, again being from 1 to 50% by weight.

In addition to bisphenol-A-homopolycarbonate, preferred polycarbonates are the copolycarbonates of bisphenol A with up to 15 mol-%, based on the mol total of diphenols, of 2,2-bis-(3,5-dibromo-4-hydroxyphenyl)-propane and the copolycarbonates of the diphenols of formula (VIII) with 1 to 50% by weight of diphenols corresponding to formula (VIIIa) and preferably to formula (VIIIb), based in each case on the total weight of the diphenols (VIII) and (VIIIa) or (VIII) and (VIIIb).

The polycarbonates of component (1.) suitable for use in accordance with the invention may be branched in known manner, preferably by the incorporation of 0.05 to 2.0 mol-%, based on the sum of diphenols used, of trifunctional or more than trifunctional compounds, for example those containing three or more than three phenolic groups. {- The production of the polycarbonates of component (1.) suitable for use in accordance with the invention is known and may be carried out, for example, with phosgene by the interfacial process or with phosgene by the homogeneous phase process ("pyridine process"). Molecular weight may be regulated by a corresponding quantity of chain terminators (for polycarbonates containing polydiorganosiloxanes, see DE-OS 33 34 872 (Le A 22 594)).

The polycarbonates of component (1.) suitable for use in accordance with the invention have average weight average molecular weights $M_w$, as measured by ultracentrifugation or scattered light measurement) in the range from 10,000 to 200,000 and preferably in the range from 20,000 to 80,000.

Suitable chain terminators for regulating the molecular weights of the polycarbonates of component (1.) are, for example, phenol, p-chlorophenol, p-tert.-butylphenol, 2,4,6-tribromophenol, long-chain alkylphenols, such as 4-(1,3-tetramethylbutyl)-phenol (DE-OS 28 42 005), monoalkylphenols and dialkylphenols containing a total of 8 to 20 C atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)phenol (DE-OS 35 06 472).

The quantity of chain terminator comprises 0.1 to 10 mol-%, based - in the case of the phenolic chain terminators-on mols diphenols and - in the case of monocarboxylic acid chloride chain terminators - on mols dicarboxylic acid dichlorides.

Thermoplastic, aromatic polyesters of component (1.) suitable for use in accordance with the invention are thermoplastic, aromatic polyester (carbonates) based on $C_6$–$C_{30}$ diphenols, aromatic $C_8$–$C_{14}$ dicarboxylic acids, chain terminators and, optionally, carbonic acid halides and/or branching agents.

Accordingly, polyester (carbonates) in the context of the present invention are aromatic, optionally branched polyesters which, in addition, may contain carbonate bonds, the carbonate bonds in the polycondensate chain amounting to at most 99 mol-%, preferably to 80mol-% and more preferably to 50 mol-%, based on the total mols of ester and carbonate bonds in the polycondensate chain, and the ester bonds thus amounting to at least 1 mol-%, preferably to 20 mol-% and more preferably to 50 mol-%, based on the total mols of ester and carbonate bonds in the polycondensate chain.

Suitable $C_6$–$C_{30}$ diphenols are those of formula (VIII) mentioned for the polycarbonates.

Preferred $C_6$–$C_{30}$ diphenols are again the preferred types of formula (VIII).

Suitable aromatic dicarboxylic acids are, for example, isophthalic acid, terephthalic acid, diphenylether-4,4'-dicarboxylic acid and naphthalene-2,6-dicarboxylic acid.

Preferred aromatic dicarboxylic acids are isophthalic acid, terephthalic acid and mixtures thereof in a ratio of 1:20 to 20:1.

The dicarboxylic acids are incorporated in the polyesters or in the polyester carbonates in the form of dicarboxylic acid dichlorides.

Suitable chain terminators are the phenolic types already mentioned for the production of the polycarbonates. Chlorocarbonic acid esters of these phenolic chain terminators are also suitable. Other suitable chain terminators are acid chlorides of aromatic monocarboxylic acids, for example benzoyl chloride. Other suitable chain terminators are acid chlorides of aliphatic $C_2$–$C_{22}$ acetyl chloride.

The quantity of chain terminator to be used amounts to between 0.1 and 10 mol-%, the quantity being based on mols diphenols in the case of phenolic chain terminators and on mols dicarboxylic acid dichlorides in the case of acid chloride chain terminators.

The preferred carbonic acid halide is $COCl_2$.

Possible branching agents are mentioned in DE-OS 29 40 024 and 30 07 934.

The production both of the polyesters suitable for use in accordance with the invention and of the polyester carbonates suitable for use in accordance with the invention is known (cf. for example DE-OS 29 40 024 (Le A 19 932) and DE-OS 30 07 934 (Le A 21 203) and DE-OSS 22 32 877, 27 03 376, 30 00 610 and 27 14 544 and DE-AS 14 95 626). The interfacial process is particularly preferred.

Up to 30 mol-% of the dicarboxylic acids and dihydroxy compounds ... aliphatic units, for example adipic acid, butane-1,4-diol, may also be involved in the synthesis of the polyester (carbonates) of component (1.) suitable for use in accordance with the invention.

The polyester (carbonates) of component (1.) suitable for use in accordance with the invention may also contain aromatic hydroxycarboxylic acids, i.e. for example p-hydroxybenzoic acid, which may be incorporated in known manner taking the diphenol and dicarboxylic acid units into account. Accordingly, 1 mol aromatic hydroxycarboxylic acid replaces ½ mol dicarboxylic acid and ½ mol diphenol.

The ester groups and carbonate groups may be statistically distributed or even arranged in blocks in the polyester carbonates of component (1.).

The thermoplastic aromatic pqlyesters of component (1.) suitable for use in accordance with the invention have relative solution viscosities ($n_{rel}$) in the range from 1.18 to 1.4 and preferably in the range from 1.22 to 1.3 (as measured on solutions of 0.5 g polyester in 100 ml $CH_2Cl_2$ solution at 25° C.).

The mixtures of component (1.) and (2.) according to the invention show excellent toughness values combined with high resistance to the effect of organic solvents and good flow behavior.

The mixtures according to the invention may contain further additives, such as stabilizers, pigments, mold release agents, flameproofing agents and/or antistatic agents.

The mixtures according to the invention containing components (1.), (2.) and, optionally, further additives may be prepared by mixing their constituents in known manner and melt-compounding or melt-extruding the resulting mixtures at temperatures of 200 to 330° C. in standard mixing units, such as internal kneaders, extruders or twin-screw extruders.

Accordingly, the present invention also relates to a process for the production of mixtures containing components (1.), (2.) and, optionally, stabilizers, pigments, mold release agents, flameproofing agents and/or antistatic agents, characterized in that components (1.) and (2.) and, optionally, stabilizers, pigments, mold release agents, flameproofing agents and/or antistatic agents are mixed in known manner and the resulting mixture is then melt-compounded or melt-extruded in standard mixing units at temperatures in the range from 200 to 330° C.

The constituents may be mixed in known manner both gradually and also simultaneously both at around 20° C. (room temperature) and at higher temperatures.

The molding compounds according to the invention may be used for the production of moldings of all kinds. In particular, moldings may be produced by injection molding. Examples of moldings which can be produced from the molding compounds according to the invention include housing components for domestic appliances, moldings for the interior of motor vehicles and, more particularly, for the exterior of motor vehicles.

Another form of processing is the production of moldings by deep drawing from prefabricated sheets or films.

EXAMPLES

Polycondensates and polymers used 1.1. Polycarbonate based on bisphenol A, relative solution viscosity $\eta_{rel}$ 1.26 to 1.28, as measured in $CH_2Cl_2$ at 25° C. and at a concentration of 0.5 g/100 ml.

1.2. Copolycarbonate based on bisphenol A and 5% by weight polydimethylsiloxane having a block length ($P_n$) of 40, relative solution viscosity 1.3, as measured in $CH_2Cl_2$ at 25° C. and at a concentration of 0.5 g/100 ml.

1.3. Polyestercarbonate, ester content 80 mol-%, based on bisphenol A, isophthalic acid and terephthalic acid (1:1), relative solution viscosity 1.3, as measured in $CH_2Cl_2$ to 0.5 g/100 ml.

2.1. Block copolymer of the A—X—B type where A is polyneopentyl glycol carbonate and B poly-ε-caprolactone. X is a tapered middle segment of neopentyl glycol carbonate and ε-caprolactone. The block copolymer was obtained by ring-opening anionic copolymerization of neopentyl glycol carbonate and ε-caprolactone. The ratio by weight of the monomers neopentyl glycol carbonate and ε-caprolactone in the block copolymer is 78:22 (as determined by $^1$H-NMR spectroscopy). The relative solution viscosity $\eta_{rel}$ of the block copolymer is 3.27 (2% by weight solution in $CH_2Cl_2$ at 20° C.).

2.2. As 2.1.

Ratio by weight of neopentyl glycol carbonate to ε-caprolactone =61:39; $\eta_{rel}$=4 02.

2.3. As 2.1.

Ratio by weight of neopentyl glycol carbonate to ε-caprolactone =85:15; $\eta_{rel}$=2.53.

3. Phosphorous acid ester of bis-(2-hydroxy-3-cyclohexyl-5-methylphenyl)-methane as stabilizer.

The components were compounded in a 1.3 liter internal kneader.

The moldings were made in an injection molding machine at 260° C. and 280° C.

The Izod notched impact strength $a_k$ was measured on bars measuring 80×10×4 mm in accordance with ISO 180 1 A at the temperatures shown in the Examples.

Flowability was evaluated from the filling pressure (cf. Johannaber, Kunststoffe 74 (1984, 1; pages 1–5) required in the injection molding machine used (melt temperature: 260° C., 280° C.) to produce bars measuring 80×10×4 mm.

Stress cracking behavior was investigated using bars measuring 80×10×4 mm (melt temperature 260° C.). A mixture of 50% toluene and 50% isooctane was used as simulated fuel. The test specimens were pre-extended using an arcuate template and stored for 5 minutes at room temperature in the simulated fuel. The pre-extension $\epsilon_x$ measured 0.2 to 2.4%. Stress cracking behavior was evaluated from the cracks formed or from the fracture as a function of the pre-extension.

The composition of the tested materials and the data obtained are shown in the following Table:

TABLE 1

| Components | Examples according to the invention (parts by weight) | | | Comparison Example (parts by weight) |
|---|---|---|---|---|
| | 1 | 2 | 3 | 4 |
| 1.1. | 95 | 90 | 80 | 100 |
| 2.1. | 5 | 10 | 20 | — |
| Tests | | | | |
| Notched impact strength $a_k$ | | | | |
| $a_k$ (RT) (KJ/m$^2$) (260° C.) | 18 | 48 | 58 | 9 |
| Filling pressure (bar) at 260° C. | 112 | 80 | — | 138 |
| Stress cracking behavior | | | | |
| EC/UC* on pre-extension $\epsilon_x$ (%) | — | 0.7 | 0.6 | — |
| Fracture on pre-extension $\epsilon_x$ (%) | 0.4 | 1.2 | — | 0.4 |
| No fracture on pre-extension $\epsilon_x$ (%) | — | — | 2.4 | — |

*EC/UC: edge/upper cracks

TABLE 2

| Components | Examples according to the invention (parts by weight) | | Comparison Example (parts by weight) |
|---|---|---|---|
| | 5 | 6 | 7 |
| 1.2. | 93 | 93 | 100 |
| 2.1. | 7 | — | — |
| 2.2. | — | 7 | — |
| Tests | 5 | 6 | 7 |
| Notched impact strength $a_k$ | | | |
| $a_k$ (RT) (kJ/m$^2$) (260° C.) | 65 | 57 | 65 |
| Filling pressure (bar) at 260° C. | 97 | 119 | 154 |
| EC/UC* on pre-extension $\epsilon_x$ (%) | 0.7 | 0.7 | — |
| Fracture on pre-extension $\epsilon_x$ (%) | — | 1.0 | 0.4 |
| No fracture on pre-extension $\epsilon_x$ (%) | 2.4 | — | — |

*EC/UC edge/upper cracks

TABLE 3

| Components | Examples according to the invention | | Comparison Example |
|---|---|---|---|
| | 8 | 9 | 10 |
| 1.1. | 55 | 50 | 60 |
| 1.3. | 35 | 30 | 40 |
| 2.3. | 10 | 20 | — |
| 3. | 0.25 | 0.25 | 0.25 |
| Tests | 8 | 9 | 10 |
| Notched impact strength $a_k$ | | | |
| $a_k$ (RT) (kJ/m$^2$) (280° C.) | 8 × 49<br>2 × 27 | 90 | 7 × 37<br>3 × 23 |
| $a_k$ (+10° C.) (kJ/m$^2$) (280° C.) | 2 × 34<br>8 × 25 | 71 | 17 |
| Filling pressure (bar) at 280° C. | 55 | — | 134 |
| Stress cracking behavior | | | |
| EC/UC* on pre-extension $\epsilon_x$ (%) | 0.6 | 1.0 | 0.2 |
| Fracture on pre-extension $\epsilon_x$ (%) | 1.0 | 2.4 | 0.4 |

*EC/UC edge/upper cracks

We claim:
1. Mixtures containing
(I.) 10 to 98 parts by weight of thermoplastic aromatic polycarbonates or thermoplastic aromatic polyester or a mixture of both and
(II.) 90 to 2 parts by weight of copolymers corresponding to formula (Ia)

$$-[A-X-B]_r \quad \text{(Ia)}$$

in which r is an integer of 1 to 20,
 —A— represents polymers of cyclic carbonates corresponding to formula (v)

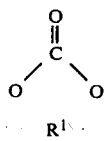

or to formula (VI)

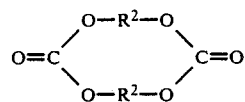

or to formula (v) and (VI),
—B— represents polymers of lactones corresponding to formula (VII)

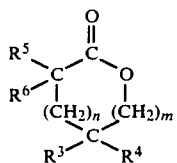

and
—X— represents polymers containing at least one of the carbonates (V) or (VI) together with the lactones (VII) in polymerized form, the concentration of the polymerized carbonates (V) and (VI) decreasing continuously towards the blocks —B— and the concentration of the polymerized lactones (VII) decreasing continuously towards the blocks —A— ("tapered structure") and the sum of the parts by weight of components (I) and (II) amounting to 100 parts by weight;
$R^1$ in (V) is a linear $C_3$-$C_{10}$ alkylene or a moiety corresponding to formulae (a) to (l)
(a) —CH$_2$CH$_2$CH(CH$_3$)—
(b) —CH$_2$CH$_2$OCH$_2$CH$_2$OCH$_2$CH$_2$—,
(c) —CH$_2$CH(CH$_3$)CH$_2$CH$_2$C(CH$_3$)$_2$CH$_2$—,

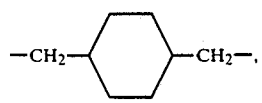

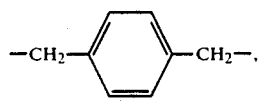

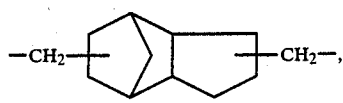

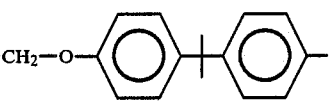

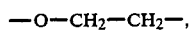

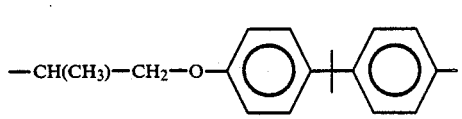

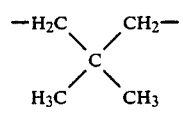

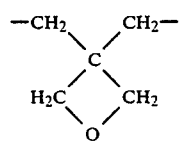

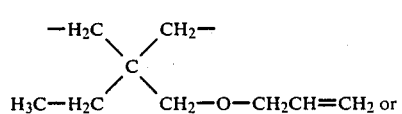

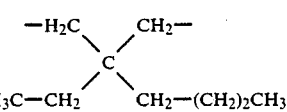

$R^2$ in (VI) is a linear $C_4$-$C_{12}$ alkylene or a moiety corresponding to formulae (m) or (b)
(m) —CH$_2$—CH$_2$—O—CH$_2$—CH$_2$— or
(b) —CH$_2$—CH$_2$—O—CH$_2$—CH$_2$—O—CH$_2$—CH$_2$— and
$R^3$, $R^4$, $R^5$ and $R^6$ in (VII) are the same or different and each represents H, $C_1$-$C_6$ alkyl, $C_3$-$C_6$ alkylene, $C_1$-$C_6$ alkoxy or $C_2$-$C_6$-alkyleneoxy-$C_1$-$C_6$-alkyl, and
m and n in (VII) independently of one another are 0, 1, 2, 3, 4, 5 or 6.

2. Mixtures as claimed in claim 1, characterized in that they contain from 20 to 95 parts by weight of component (I) and 80 to 5 parts by weight of component (II).

3. Mixtures as claimed in claim 1, characterized in that, in the copolymer of formula (Ia), r is an integer of from 1 to 10.

4. Mixtures as claimed in claim 1, characterized in that component (I) is a thermoplastic polycarbonate based on diphenols corresponding to formula (VIII)

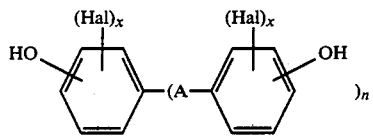 (VIII)

in which

A is a single bond, $C_1$–$C_5$ alkylene, $C_2$–$C_5$ alkylidene, a $C_5$–$C_6$ cycloalkylidene, —S—, —$SO_2$— or a moiety of the formula

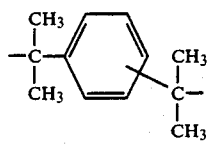

Hal is chlorine or bromine,
x=0, 1 or 2 and
n=1 or 0.

5. Mixtures as claimed in claim 1, characterized in that component (I) is a thermoplastic polycarbonate based on diphenols corresponding to the formula (VIIIa)

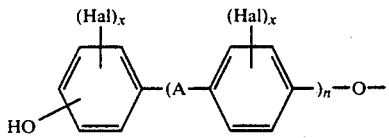 (VIIIa)

-continued

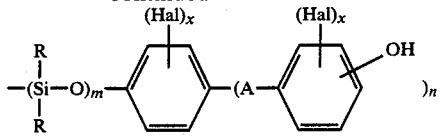

in which

A is a single bond, $C_1$–$C_5$ alkylene, $C_2$–$C_5$ alkylidene, a $C_5$–$C_6$ cycloalkylidene, —S—, —$SO_2$— or a moiety of the formula

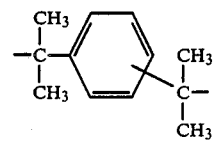

Hal is chlorine or bromine,
x=0, 1 or 2 and
n=1 or 0.
the substituents R are the same or different and represent linear $C_1$–$C_{10}$ alkyl, branched $C_3$–$C_{20}$ alkyl or $C_6$–$C_{20}$ aryl and m is an integer of from 5 to 100.

6. Mixtures as claimed in claim 1, characterized in that component (I) is a thermoplastic aromatic polyester based on $C_6$–$C_{30}$ diphenols, aromatic $C_8$–$C_{14}$ dicarboxylic acids and chain terminators.

7. Mixtures as claimed in claim 6, characterized in that component (I) additionally contains at least one of carbonic acid halides or branching agents.

8. Mixtures as claimed in claim 6, characterized in that component (I) is a thermoplastic aromatic polyester carbonate.

9. Mixtures as claimed in claim 1, characterized in that they additionally contain at least one of stabilizers, pigments, mold release agents, flameproofing agents or antistatic agents.

* * * * *